Aug. 8, 1967  C. L. YANDELL  3,335,371
MEANS FOR LOCATING AIRCRAFT
Filed June 17, 1965  2 Sheets-Sheet 1
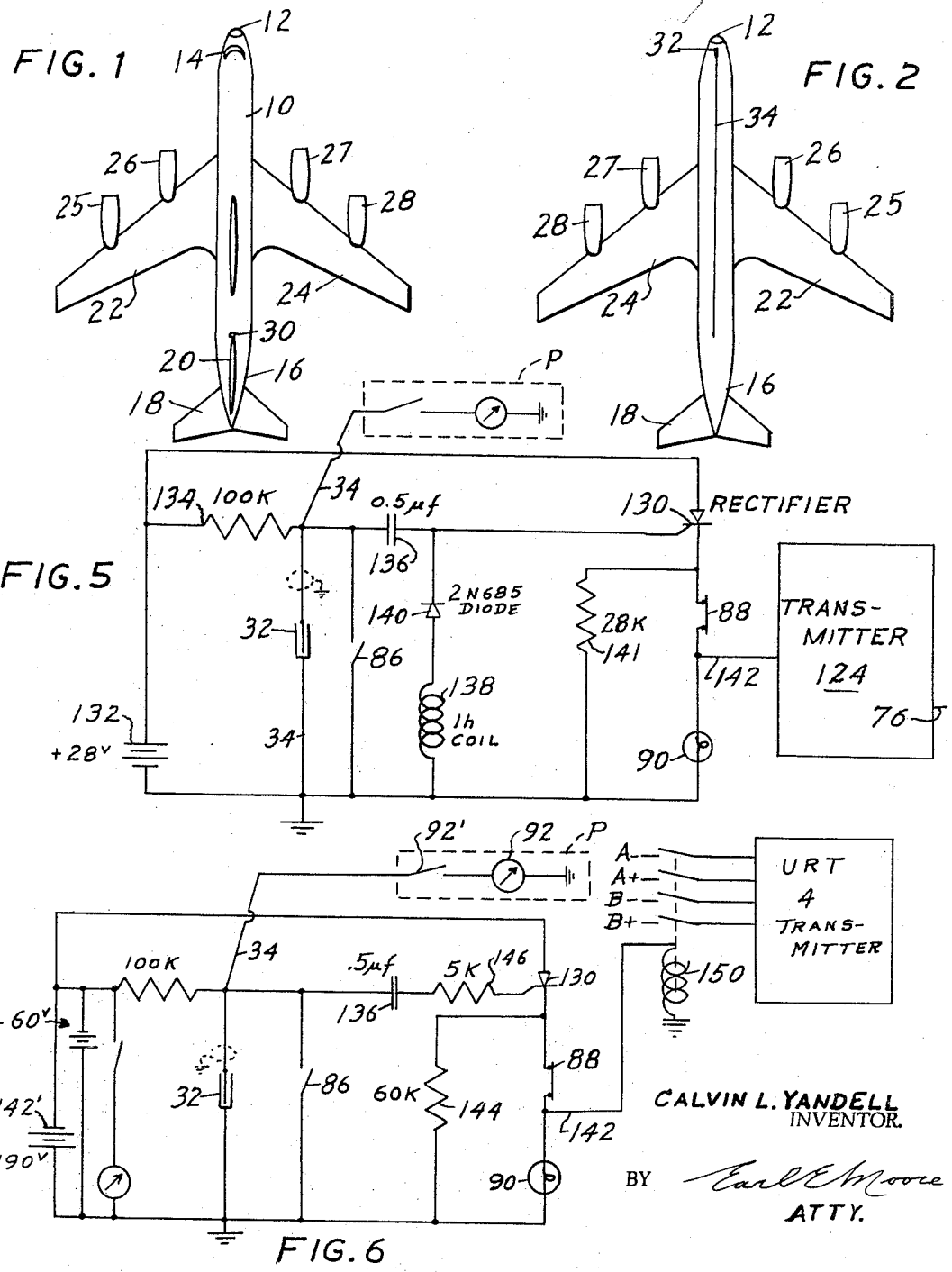
CALVIN L. YANDELL
INVENTOR.
BY Earl E. Moore
ATTY.

Aug. 8, 1967     C. L. YANDELL     3,335,371
MEANS FOR LOCATING AIRCRAFT
Filed June 17, 1965     2 Sheets-Sheet 2
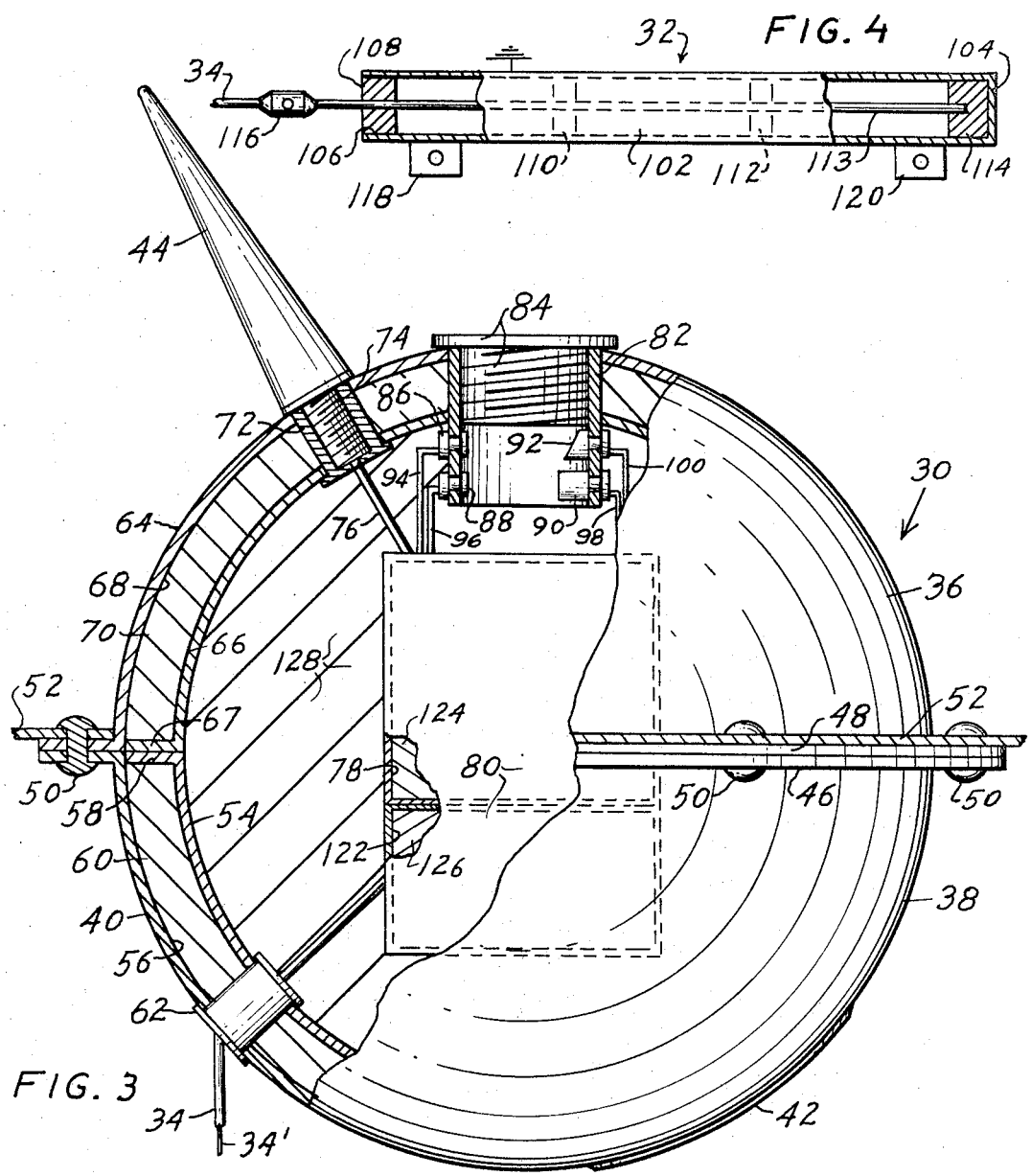
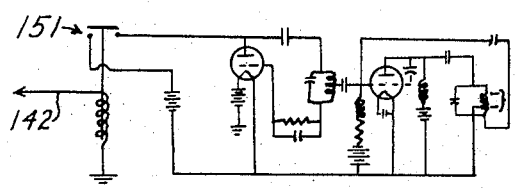
FIG. 7
CALVIN L. YANDELL
INVENTOR.
BY Earl E Moore
ATTY.

United States Patent Office 3,335,371
Patented Aug. 8, 1967

3,335,371
MEANS FOR LOCATING AIRCRAFT
Calvin L. Yandell, 15121 Whittram Ave.,
Fontana, Calif. 92335
Filed June 17, 1965, Ser. No. 464,802
3 Claims. (Cl. 325—115)

ABSTRACT OF THE DISCLOSURE

The invention concerns automatic radio sending means which is switched to an on position automatically when certain parts connected therewith are damaged; for instance, when aircraft, so equipped, is forced down to earth, it enables rescue parties with radio receivers to locate the aircraft. The radio sending means operates whether it remains with the aircraft after a crash or is cast from the aircraft.

---

This invention relates to means and ways of locating airplanes and other craft which have been forced to land or founder in a remote area of the earth. Occasionally an airplane is lost in a wilderness area and not found for many months. The teachings of this invention is for the purpose of locating such lost aircraft etc. and hence render assistance as soon as possible.

In accordance to this invention, a self radiating telltale unit or informer device is provided for all kinds of air craft, land craft, and sea craft and which device continuously sends radio waves at a given frequency automatically when a certain part thereof is crushed and/or shorted electrically or when the informer device or means is purposely shorted manually. For locating the lost craft, the rescue craft need only maneuver over a large area between two points where the craft is lost and when the rescue craft receives the emergency waves from the radio of the informer device, the rescuers can then easily reorient its course to the exact spot.

Means are provided in conjunction with the radiator or informer device so that it can be thrown clear of a wrecked air, land or sea craft and continue to send specific radio waves. The informer device or electromagnetic wave sender and its auxiliary parts are made shockproof, fireproof and foolproof so as to provide a reliable informer for use of searching parties.

One of the principal objects of this invention is to provide land, sea and air craft with electrical informers and the like that automatically, or manually controlled, send out electromagnetic waves to enable searching crafts to locate the place of a wrecked or distressed craft.

Another object is to provide crafts of various kinds with electromagnetic wave informer units or devices that can be easily spotted by rescue craft and wherein the informer device is foolproof, fireproof and shockproof, and wherein the informer device is designed to assume an oriented position so that the radiator (antenna) is spaced from the supporting surface which in most cases would be the ground or earth or some part thereof.

Still another object is to provide an informer device with a sensor means which is adapted to be shorted when damaged or crushed and thus act as a switch means to start the informer to radiate radio waves at a predetermined frequency.

Other objects and purposes of this invention will become apparent upon perusal of the specifications and claims.

In the drawings:

FIG. 1 is a top plan view of a typical airplane;
FIG. 2 is a bottom plan view of the above;
FIG. 3 is an enlarged elevational view, partly in section, showing an automatic informer device;
FIG. 4 is an elevational view, partly in section, of a sensor device;
FIG. 5 is a schematic showing of a radio circuit;
FIG. 6 is another schematic radio circuit of a modified form;
FIG. 7 is a schematic transmitting circuit that can be employed for sending radio waves at a set frequency.

In order to disclose fully one preferred form of the invention, reference is made to FIGS. 1 to 5 inclusive of the drawings and wherein like parts are given the same reference numerals or characters.

In FIGS. 1 and 2, the fuselage 10 of an airplane has the nose portion 12, control cabin or cockpit 14, tail section 16 with the stabilizer-elevator combination 18 and the fin-rudder combination 20. Side wings 22 and 24 are provided with the well known jet engines 25 to 28 inclusive. Just forwardly of the fin-rudder combination 20 is positioned an electrical informer device or unit 30 to be presently explained. The informer device 30 need not necessarily be positioned as shown in that it may be located at any part of the craft, but for the sake of reliability, the informer device is positioned just forward of the fin-rudder combination where planes generally receive less damage than other parts thereof.

At the nose portion of the craft, is positioned a sensor or switch-like element 32 that is attached to the craft at an under portion thereof. At this position of attachment, the sensor is almost certain to be crushed or damaged so that it will be switched to ground the live side of the coaxial cable 34 and sensor rod 113 for the intended purposes. A coaxial cable 34 leads from the sensor and makes connection with the informer 30. This cable is attached to the bottom surface of the craft by any suitable means, such as straps, screws, bolts, cement etc. By running the cable along the bottom of the craft, it too acts as a sensor in that it also can short the line to switch-on the informer. This may be the case when the craft lands in such a manner that the sensor 32 is not damaged but the cable line is damaged or crushed to cause a short. Obviously, the outer casing of the coaxial cable is also grounded to the craft as well as to the outer shell of the informer. The inner protected conductor of the cable carries non-grounded electric current and acts as a switch-leg upon shorting same to the ground.

The informer 30 is shown as consisting of two half spherical portions indicated by the reference characters 36 and 38. A certain portion of the outer shell 40 of the lower portion 38 is provided with a weighted plate or means 42 which may be a metal plate of high fusion temperature material and which is fixed to the shell 40 by welding or brazing. This weighted plate is designed to be opposite the position of the radiator or antenna 44 so that in the event the informer is cast free from the craft, the weighted portion will aid in positioning the informer so that the antenna is raised above the ground or earth surface when the informer rolls.

The lower portion of the informer is provided with the outwardly directed annular flange 46 and the upper portion 36 provided with a similar flange 48 so that the sphere has matching flanges at its equator for sealing purposes. A plurality of rivets or bolts 50 join the two halves together to make the sphere. A suitable gasket may be provided between the flanges to make the seal more complete, that is, weather and fire tight. The rivets also attach the informer device to the skin 52 of the airplane. Obviously, other means of attachment to the airplane may be employed. The spherical shape of the informer is so designed so that it can easily roll away from a damaged plane if loosened sufficiently during a crash landing.

However, if needs require it, the informer may assume any geometrical configuration to suit specific constructions of the craft wherein it is mounted.

The lower portion 38 with its outer shell 40 has spaced therefrom another shell or inner shell 54 to form a curved or arcuate peripheral chamber 56. This chamber is closed at its ends by folding inwardly edges of the shell 54 to form an end wall means 58, as shown. Thus the chamber 56 is closed and is provided with a suitable fireproof filler material such as granulated asbestos and the like indicated at 60. The pair of shells have alined openings to accommodate suitable inlet sleeve means 62 for the passage of the coaxial cable into the informer.

The top portion of the spherical informer device also has a pair of spaced walls or arcuate shells 64 and 66 providing an arcuate chamber 68 which is filled with granulated asbestos 70. A sleeve means 72 is sealed in alined openings of the outer and inner shells 64–66 and it is threaded to accommodate the threaded stub end 74 of the antenna means 44. The antenna is preferably a non-corrosive metal for radiation of radio waves and which may be chrome plated copper or stainless steel; and this is also true for the threaded end 74. All structural parts of the informer should be of stainless steel or some equivalent material. The sleeve means 72 should be a suitable non-conductor of electricity such as any of the well known tough plastics that can stand a high heat without failure. The antenna is connected to an electrical conductor 76 that in turn is connected to a transmitter outlet means, that is, it passes into the container 78 of the power box or large container 80 which will be explained later.

Another pair of alined openings accommodate a sleeve or well means 82 which is internally threaded at the top portion thereof to accommodate the threaded closure or plug means 84. This well-like chamber supports a test switch 86, reset switch 88, pilot light means 90, and a combination battery indicator switch and meter means 92. The electrical conductors 94, 96, 98 and 100 make connection with their respective electrical fixtures just mentioned and they lead into the container 80.

The sensor or switch-like control means 32, shown best in FIG. 4, consists of a casing or tube-like means 102 having the closed end 104 and the open end 106. Fixed in position within this casing are the spaced apart insulator blocks 108, 110, 112 and 114. This casing 102 may be of any suitable shape in cross section, that is, round or rectangular for instance.

Each insulator 108–114 is provided with a bore to accommodate a sensor rod 113 of good electrical conducting material, such as copper; and this rod is connected to the coaxial cable 34 by the suitable riveted connector means 116. The casing is grounded to the grounded plane structure and provided with one or more integral ears 118 and 120 so that the sensor can be secured to an under portion of the aircraft by rivets, bolts etc.

Within the casing or container 80 there is the transmitter portion 78 and a control circuit in the portion 122. Attention is now directed to the control circuit shown in FIG. 5. Note, that the portion 78 (and 122) are filled with a suitable insulating material 124 and 126, respectively, so as to prevent shorts and also to cushion the elements which make-up their respective circuits. It is deemed important to insert here, that the entire container 80 is centered within the sphere 30 and that the spaces between the container 80 and the inner walls or shells 54 and 56 are filled with a suitable shock absorber material as indicated at 128. This shockproof protective material may be a jelly, liquid, or some semi-solid material such as neoprene or silicone rubber. It is preferred, however, to employ a transparent Epoxy Gel as called out in the Emerson & Cuming, Inc. bulletin 15–2–3, Eccogel 1265.

The transmitter is a modified RT–159/URC–4 complete with power pack. It works on the emergency frequency of 243.00 mc. The entire unit 30, regardless of its configuration, is termed a telltale or informer, and the switch-like means or unit 32 is termed a sensor. The internal conductor of the sensor and/or the connected internal conductor 34' of the coaxial cable 34 must be grounded in order to energize the turn-on circuit shown in FIG. 5 and hence cause operation of the transmitter 124.

The power of the turn-on circuit is switched to the on position through the silicon controlled rectifier 130. This occurs after a pulse is received at the gate 130 as a result of a short of the crush sensor 32 or when the test switch 86 is closed. The 0.5 microfarad condenser is charged by the battery 132 through the 100K resistor 134 and gate 130. Upon the shorting of the sensor, or its cable 34, the condenser 136 is discharged through the sensor and the coil 138.

When the coil 138 is energized a current continues to flow causing a positive voltage at the gate 130 and thus switches on the rectifier. The gate 130 will remain at a low resistance (thus the unit will continue to transmit) until deactivated by the reset switch 88.

The function of the battery test switch is to allow a visible check of the condition of the batteries without removing them from the unit. The function of the diode 140 is to prevent current reversal in the coil which could shut off the gate 130. Resistor 28K indicated at 141 shunts the pilot lamp 90. Resistors 141 and 144 serve to maintain cathode or S.C.R. at ground potential before S.C.R. is turned on.

The circuit shown in FIG. 6 is similar to that shown in FIG. 5 except that it is designed for operation with a modified RT–1598/URC–4 transmitter. A minus voltage must be available for this transmitter as indicated at 142'. The positive voltage change created by shorting the sensor can be applied directly to the gate 130 without using the voltage reversal feature used in FIG. 4. A shunt 144 of 60K is provided and a 5K resistor 146 is shown in series with the condenser 136. The pilot light 90 in both circuits indicate when the power is supplied to the transmitter through conductor 142.

The B+ can be monitored by a meter attached to the center conductor on the sensor on the instrument panel through a press test switch. Voltage on the sensor implies that the sensor has not been shorted and that the transmitter is inactive.

As shown in FIG. 7, a simple transmitter is shown connected to the feed conductor 142. The solenoid 150 of a relay 151 is energized to close the switch means thereof and thus cause the transmitter circuit shown in FIG. 7 to constantly radiate a signal at a specific frequency. It is deemed unnecessary to explain the details of such a transmitter as same is clearly self-explanatory in the illustration. Any type of transmitter may be employed and if preferable, an all transistor transmitter may be used.

Certain novel features and details of this invention are disclosed herein and in some cases in considerable detail in order to make the invention clear in at least one form thereof; however, it is to be clearly understood that the invention, as disclosed, is not necessarily limited to the exact form or forms and details disclosed since it is apparent that various modifications and changes may be made without departing from the spirit and scope of the invention.

Having thus described my invention, what is claimed as new and desired to be secured by Letters Patent is:

1. An informer means to aid in the location of disabled craft; the means comprising a switching device having a fixed connection to and grounded to the forward end portion of the craft, a spherical signal radio radiating device fixed to a rearward portion of the craft, an elongated cable connecting the switching device with the radiating device and wherein one electrical side thereof is grounded to the craft, said cable being fixed to the craft along the bottom thereof so that crushing of the cable can switch on the radiating device independent of the switching device.

2. The informer means recited in claim 1 wherein the radiating device consists of a housing having two half portions with flanges which are secured together and wherein the flanges are fixed to the skin portion of the craft.

3. The informer means recited in claim 2 wherein a short antenna extends from one side of the radiator and an unbalancing weight is fixed to the opposite side of the radiator so that when the radiator is cast away from the craft at time of an accident, the antenna is clear of the ground.

References Cited

UNITED STATES PATENTS

| | | | |
|---|---|---|---|
| 2,149,808 | 3/1939 | Ellis | 325—115 |
| 2,519,553 | 8/1950 | Faulkner | 325—114 |
| 2,552,969 | 5/1951 | Holman | 325—114 |
| 2,831,967 | 4/1958 | Bayze | 325—112 |
| 2,959,671 | 11/1960 | Stevinson | 325—115 X |
| 3,102,982 | 9/1963 | Stypulkowski et al. | 325—115 X |
| 3,277,429 | 10/1966 | Hammond | 325—116 X |

JOHN W. CALDWELL, *Acting Primary Examiner.*